US012124196B2

(12) United States Patent
Doi

(10) Patent No.: US 12,124,196 B2
(45) Date of Patent: Oct. 22, 2024

(54) IMAGE FORMING APPARATUS AND IMAGE FIXING METHOD

(71) Applicant: Toshiba Tec Kabushiki Kaisha, Tokyo (JP)

(72) Inventor: Yohei Doi, Mishima Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 18/480,874

(22) Filed: Oct. 4, 2023

(65) Prior Publication Data

US 2024/0045358 A1 Feb. 8, 2024

Related U.S. Application Data

(63) Continuation of application No. 17/463,462, filed on Aug. 31, 2021, now Pat. No. 11,809,108, which is a continuation of application No. 17/003,880, filed on Aug. 26, 2020, now Pat. No. 11,150,582.

(30) Foreign Application Priority Data

Dec. 19, 2019 (JP) ................................ 2019-228869

(51) Int. Cl.
*G03G 15/20* (2006.01)

(52) U.S. Cl.
CPC ....... *G03G 15/205* (2013.01); *G03G 15/2053* (2013.01); *G03G 2215/00734* (2013.01)

(58) Field of Classification Search
CPC ............. G03G 15/205; G03G 15/2053; G03G 2215/00734
See application file for complete search history.

(56) References Cited

U.S. PATENT DOCUMENTS

| | | | |
|---|---|---|---|
| 9,658,581 | B2 | 5/2017 | Mochizuki |
| 10,542,588 | B2 | 1/2020 | Aritaki |
| 11,150,582 | B2 | 10/2021 | Doi |
| 2010/0166446 | A1 | 7/2010 | Naganawa |
| 2014/0205336 | A1 | 7/2014 | Chu |
| 2016/0216653 | A1 | 7/2016 | Yajima |
| 2017/0075269 | A1 | 3/2017 | Iwasaki |

(Continued)

FOREIGN PATENT DOCUMENTS

| | | | |
|---|---|---|---|
| EP | 3305390 | A1 | 4/2018 |
| JP | 2009237328 | A | 10/2009 |

(Continued)

OTHER PUBLICATIONS

Japanese Office Action dated Aug. 1, 2023, mailed in counterpart Japanese Application No. 2019-228869, 8 pages (with translation).

*Primary Examiner* — Victor Verbitsky
(74) *Attorney, Agent, or Firm* — Kim & Stewart LLP

(57) ABSTRACT

An image forming apparatus according to one or more embodiments includes a fixing device and a controller. The fixing device includes a first heating source and a second heating source. The second heating source has a heating width greater than that of the first heating source. The first and second heating sources have different heating characteristics in response to temperature increases. The controller selects one of the first heating source and the second heating source according to a size of a sheet on which printing is to be performed.

16 Claims, 6 Drawing Sheets

(56) References Cited

U.S. PATENT DOCUMENTS

| | | | | |
|---|---|---|---|---|
| 2020/0201214 | A1* | 6/2020 | Ogura ................ | G03G 15/2042 |
| 2021/0389700 | A1 | 12/2021 | Doi | |

FOREIGN PATENT DOCUMENTS

| | | | |
|---|---|---|---|
| JP | 2014228731 | A | 12/2014 |
| JP | 2015099269 | A | 5/2015 |
| JP | 2017059327 | A | 3/2017 |
| JP | 2017059328 | A | 3/2017 |
| JP | 2019164343 | A | 9/2019 |

* cited by examiner

IMAGE FORMING APPARATUS AND IMAGE FIXING METHOD

CROSS-REFERENCE TO RELATED APPLICATIONS

This application is a continuation of U.S. patent application Ser. No. 17/463,462, filed Aug. 31, 2021, which is a continuation of U.S. patent application Ser. No. 17/003,880, filed Aug. 26, 2020, now U.S. Pat. No. 11,150,582, granted Oct. 19, 2021, which is based upon and claims the benefit of priority from Japanese Patent Application No. 2019-228869, filed Dec. 19, 2019, the entire contents of each of which are incorporated herein by reference.

FIELD

Embodiments described herein relate generally to an image forming apparatus and an image fixing method.

BACKGROUND

An image forming apparatus utilizing continuous printing includes an image forming unit configured to form an image on a sheet and a fixing device configured to fix the image on the sheet. The fixing device is equipped with a planar heater having a specific resistance temperature coefficient as a measure against a temperature rise at an end portion of a non-sheet passing region of the fixing device. The planar heater of the fixing device may have a characteristic that when the temperature of the heater increases, the output power of the heater greatly decreases. In such a planar heater, there are some cases where printing may not be efficiently performed because the power output in a sheet passing region is reduced. This is not limited to the planar heater and may occur in any heating sources having a characteristic in which the output power decreases when the temperature increases.

DETAILED DESCRIPTION

An image forming apparatus according to one or more embodiments includes a fixing device and a controller. The fixing device is configured to fix an image to a sheet and includes a first heating source and a second heating source. The second heating source has a heating width greater than a heating width of the first heating source. The second heating source has a heating output power that decreases with increases in temperature. The first heating source has a heating output power that decreases with increases in temperature less than the second heating source. The controller configured to select one of the first heating source or the second heating source in accordance with a size of a sheet to be supplied to the fixing device for fixing.

Hereinafter, an image forming apparatus and an image fixing method according to one or more example embodiments will be described with reference to the drawings.

Figure 1:
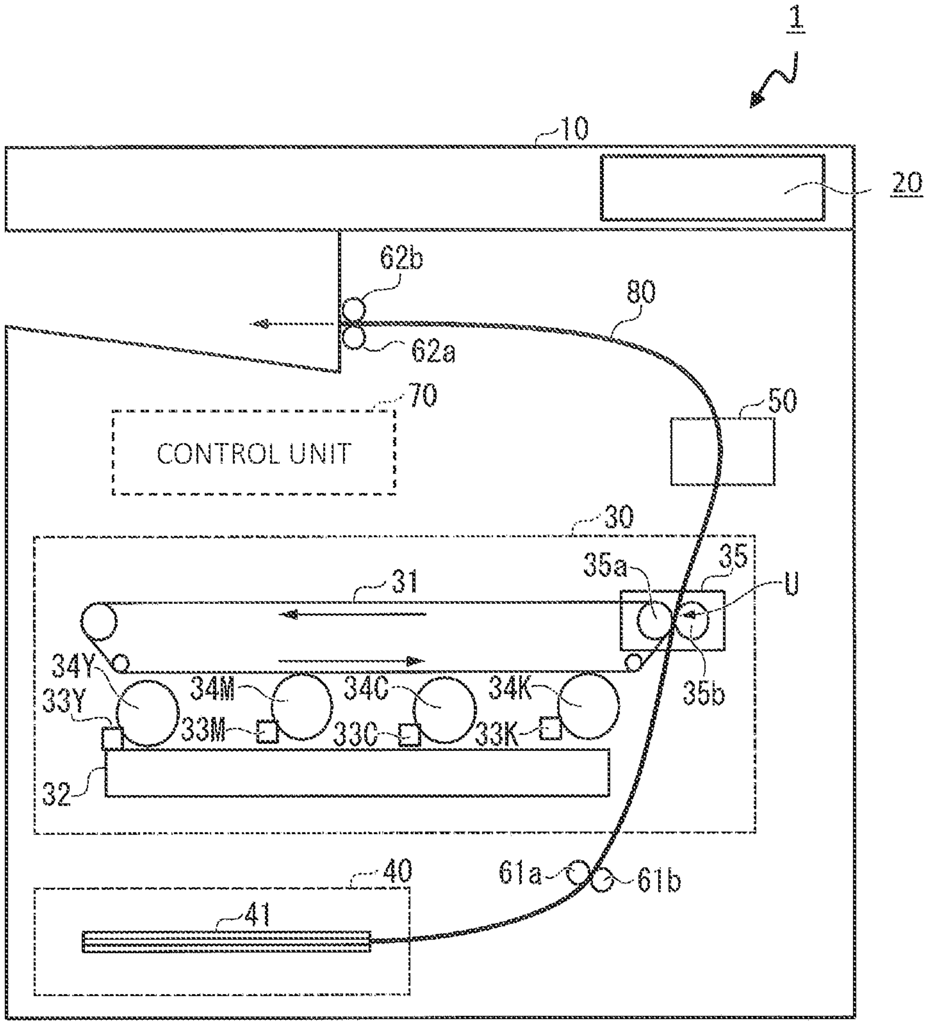
FIG. 1 is a diagram illustrating an image forming apparatus according to an embodiment.

FIG. 1 is a diagram illustrating an example of an overall configuration of an image forming apparatus 1 according to an embodiment. The image forming apparatus 1 according to the embodiment is a multi-function peripheral (MFP). The image forming apparatus 1 executes printing by an image forming process and an image fixing process. The image forming process is a process of forming an image on a sheet. The image fixing process is a process of fixing an image formed on a sheet. The sheet is, for example, a paper on which characters, images, and the like are formed. The sheet may be any object on which the image forming apparatus 1 can form an image.

The image forming apparatus 1 includes an image reading unit 10, a control panel 20, an image forming unit 30, a sheet accommodation unit 40, a fixing device 50, conveyance rollers 61*a* and 61*b*, paper discharge rollers 62*a* and 62*b*, and a control unit 70.

The image reading unit 10 reads an image on a document as light intensity (or light and dark). For example, the image reading unit 10 reads an image printed on a sheet, which is set on a document reading table. The image reading unit 10 records the read image information. The recorded image information may be transmitted to another information processing apparatus via a network connection or the like. The recorded image information may also be used as print data and printed on a sheet by the image forming unit 30.

The control panel 20 includes a display unit and an operation unit. The display unit is a display device such as a liquid crystal display and an organic electro luminescence (EL) display. The display unit displays various kinds of information related to the image forming apparatus 1 in accordance with control of the control unit 70. The operation unit includes a plurality of buttons and the like. The operation unit receives an input operation performed by a user. For example, the operation unit receives an instruction to execute printing. The operation unit outputs a signal corresponding to the input operation performed by the user to the control unit 70. The display unit and the operation unit may be configured as an integrated touch panel.

The image forming unit 30 executes an image forming process. In one embodiment, the image forming unit 30 forms an image based on an image information generated by the image reading unit 10 or an image information received through a communication path. For example, the image forming unit 30 forms a toner image on a sheet by toner.

The image forming unit 30 includes a transfer belt 31, an exposure unit 32, a plurality of developing units 33 (developing units 33Y, 33M, 33C, and 33K in the present embodiment), a plurality of photosensitive drums 34 (photosensitive drums 34Y, 34M, 34C, and 34K in the present embodiment), and a transfer unit 35.

The transfer belt 31 is an endless intermediate transfer member. The transfer belt 31 rotates in a direction indicated by an arrow (in a counterclockwise direction) by a rotation of rollers.

The exposure unit 32 is provided at a position facing the photosensitive drum 34 between the developing unit 33 and an electrostatic charger (not separately depicted). The exposure unit 32 irradiates surfaces (more specifically, photosensitive layers) of the photosensitive drums 34Y, 34M, 34C, and 34K with laser light based on image information. A direction in which the laser light scans the photosensitive drums 34 is referred to as a main scanning direction, and the direction orthogonal to the main scanning direction is referred to as a sub-scanning direction. For example, in the present embodiment, the main scanning direction coincides with the axial direction of each photosensitive drum 34, and the sub-scanning direction coincides with the rotation direction of the transfer belt 31.

The charges on the surfaces of the photosensitive drums 34Y, 34M, 34C, and 34K are lost by the irradiation of the laser light. As a result, on the surfaces of the photosensitive drums 34Y, 34M, 34C, and 34K, a pattern of static electricity is formed at a position irradiated with the laser light. This way, electrostatic latent images are formed on the surfaces of the photosensitive drums 34Y, 34M, 34C, and 34K by the irradiation of the laser beam by the exposure unit 32. Instead of the laser light, the exposure unit 32 may use light emitting diode (LED) light.

The developing units 33Y, 33M, 33C, and 33K supply toner to the photosensitive drums 34Y, 34M, 34C, and 34K, respectively. For example, the developing unit 33Y develops the electrostatic latent image on the surface of the photosensitive drum 34Y using yellow (Y) toner. The developing unit 33M develops the electrostatic latent image on the surface of the photosensitive drum 34M using magenta (M) toner. The developing unit 33C develops the electrostatic latent image on the surface of the photosensitive drum 34C using cyan (C) toner. The developing unit 33K develops the electrostatic latent image on the surface of the photosensitive drum 34K using black (K) toner.

The developing units 33Y, 33M, 33C, and 33K form visible toner images on the photosensitive drums 34Y, 34M, 34C, and 34K, respectively. The toner images formed on the photosensitive drums 34Y, 34M, 34C, and 34K are first transferred onto the transfer belt 31 by first transfer rollers (primary transfer). The first transfer rollers are each provided at positions opposed to the photosensitive drums 34Y, 34M, 34C, and 34K, respectively, with the transfer belt 31 interposed therebetween.

The transfer unit 35 includes a support roller 35*a* and a secondary transfer roller 35*b*. The transfer unit 35 transfers the toner image on the transfer belt 31 to a sheet 41 at a second transfer position U. As illustrated in FIG. 1, the second transfer position U is a position where the support roller 35*a* and the secondary transfer roller 35*b* face each other with the transfer belt 31 interposed therebetween. The transfer unit 35 applies a transfer bias to the transfer belt 31. The transfer bias is controlled by adjust a transfer current or the like in the transfer unit 35. The transfer unit 35 transfers the toner image from the transfer belt 31 to the sheet 41 by application of the transfer bias. The transfer current is controlled by the control unit 70.

The sheet accommodation unit 40 includes one or more sheet feeding cassettes. The sheet feed cassette stores a predetermined size and a predetermined type of sheets 41. The sheet feeding cassette includes a pickup roller. The pickup roller picks up each sheet 41 from the sheet feeding cassette one by one. The pickup roller supplies the taken-out sheet 41 to a conveyance unit 80.

The fixing device 50 executes an image fixing process. In one embodiment, the fixing device 50 fixes an image (for example, a toner image) formed on a sheet 41 to that sheet 41 by heating and pressing that sheet 41.

The conveyance rollers 61*a* and 61*b* supply the sheet 41 fed from the sheet feeding cassette to the image forming unit 30. The conveyance rollers 61*a* and 61*b* are disposed at opposite positions to each other.

The sheet discharge rollers 62*a* and 62*b* discharge the sheet 41 on which the image has been formed by the fixing device 50 to a discharge unit. The discharge rollers 62*a* and 62*b* are disposed at opposite positions to each other.

The control unit 70 controls the respective functional units of the image forming apparatus 1.

The conveyance unit 80 conveys the sheet 41. The conveyance unit 80 includes a conveyance path and a plurality of rollers (not separately depicted). The conveyance path is a path through which the sheet 41 is conveyed. The rollers convey the sheet 41 by rotating in accordance with the control of the control unit 70.

Figure 2:
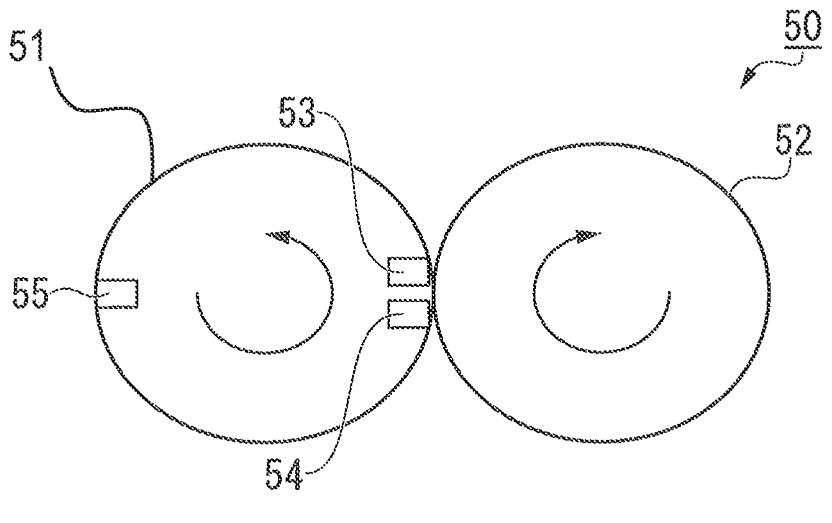
FIG. 2 is a diagram of a fixing device according to an embodiment.

FIG. 2 is a diagram for describing an internal configuration of the fixing device 50 according to an embodiment. The fixing device 50 includes a fixing belt 51, a pressing roller 52, a first heating source 53, a second heating source 54, and a temperature sensor 55.

The fixing belt 51 applies heat to the sheet 41. The fixing belt 51 is warmed by heat generated by the energization of the first heating source 53 and/or the second heating source 54 included therein. The first heating source 53 and the second heating source 54 are different in size and resistance temperature coefficient from each other. The fixing belt 51 rotates counterclockwise according to the control of the control unit 70. The first heating source 53 and the second heating source 54 are arranged in parallel with each other in the fixing device 50.

The pressing roller 52 is disposed so as to face the fixing belt 51. The pressing roller 52 presses the sheet 41 against the fixing belt 51.

The first heating source 53 is a planar heater in which a heating resistor is provided on a surface thereof. The first heating source 53 turns on or off in accordance with the presence or absence of the energization from the control unit 70. The first heating source 53 is a heater having a resistance temperature coefficient (TCR) characteristic that a change in output power is less than a threshold value in accordance with a change in temperature. In one embodiment, the first heating source 53 has a characteristic that a decrease of the output power is less than some threshold amount even when the temperature of the heater increases. Therefore, the output power of the first heating source 53 is less likely to decrease even at a high temperature. The heater width of the first heating source 53 may be a width capable of heating a sheet size of a high printing frequency or high usage (hereinafter referred to as a "first size"). The first size is, for example, A4R, A4, or the like.

The second heating source 54 is a planar heater in which a heating resistor is provided on a surface thereof. The second heating source 54 turns on or off in accordance with the presence or absence of the energization from the control unit 70. The second heating source 54 is a heater having a resistance temperature coefficient (TCR) characteristic that a change in output power is equal to or greater than a threshold value in accordance with a change in temperature. In one embodiment, the second heating source 54 has a characteristic that as the temperature of the heater increases, the output power substantially decreases. Therefore, the output power of the second heating source 54 is likely to decrease when the heater itself has a high temperature. In this example, heater width of the second heating source 54 needs to be a width capable of heating a sheet having a size larger than the first size (hereinafter referred to as a "second size"). The sheet of the second size is, for example, A3 or other sheet size that is typically used less often than the first size.

In the present embodiment, the first heating source 53 is a heater having a lower resistance temperature coefficient than that of the second heating source 54. When the resistance temperature coefficient is low, the output power can be maintained and printed even in a case where a continuous printing is performed (that is, several sheets are printed back-to-back without pause). Therefore, in a case where the image forming apparatus 1 prints the first size, the image forming apparatus 1 uses the first heating source 53 having the low resistance temperature coefficient. On the other hand, in a case of the second size for which it is more difficult to heat the entire sheet by just using the first heating source 53, the image forming apparatus 1 uses the second heating source 54.

The temperature sensor 55 measures a temperature of the fixing belt 51. The temperature sensor 55 transmits the measured temperature of the fixing belt 51 to the control unit 70.

Figure 3:
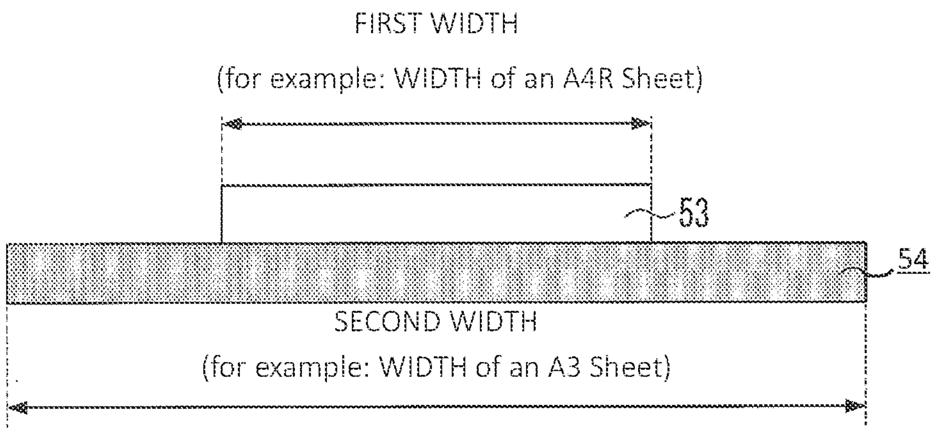
FIG. 3 is a diagram illustrating an example in which sizes of a first heating source and a second heating source in an embodiment are compared.

FIG. 3 is a diagram illustrating an example in which the sizes of the first heating source 53 and the second heating source 54 in the embodiment are compared with each other.

As shown in FIG. 3, the first heating source 53 has a first width capable of heating the entire sheet width of the first size (for example, A4R size). The second heating source 54 has a second width capable of heating the entire sheet width of the second size (for example, A3 size).

Figure 4:
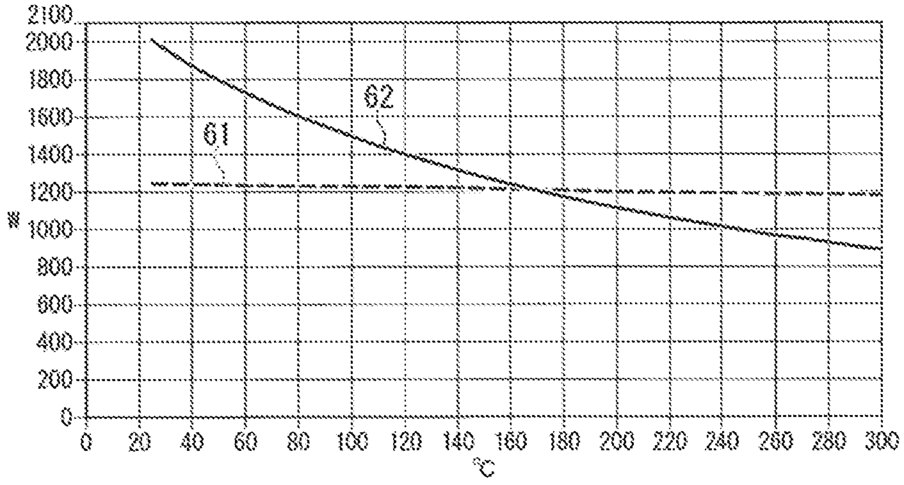
FIG. 4 is a diagram showing resistance temperature coefficients of a first heating source and a second heating source in an embodiment.

FIG. 4 is a diagram for explaining a difference in the resistance temperature coefficient in the first heating source 53 and the second heating source 54 according to an embodiment.

In FIG. 4, the horizontal axis represents the temperature of the heating source (in Celsius), and the vertical axis represents the output power of the heating source. In FIG. 4, two lines (dashed line 61 and solid line 62) are shown. The dashed line 61 reflects a heater having a resistance temperature coefficient characteristic in which a change in output power in response to a change in temperature is less than some threshold value. For example, the dashed line 61 represents a relationship between the temperature and the output power in the first heating source 53. The solid line 62 is a line reflects a heater having resistance temperature coefficient characteristic in which a change in output power in response to a change in temperature is equal to or greater than the threshold value. For example, the solid line 62 represent a relationship between the temperature and the output power in the second heating source 54.

As is apparent from FIG. 4, the second heating source 54 has a larger change in output power in accordance with a change in temperature. In such a case, it may be difficult to achieve high productivity. On the other hand, the output power of the first heating source 53 does not substantially change when the temperature rises. Therefore, even if the temperature of the first heating source 53 rises with continuous printing, it is possible to continue printing. As a result, high productivity can be realized.

Figure 5:
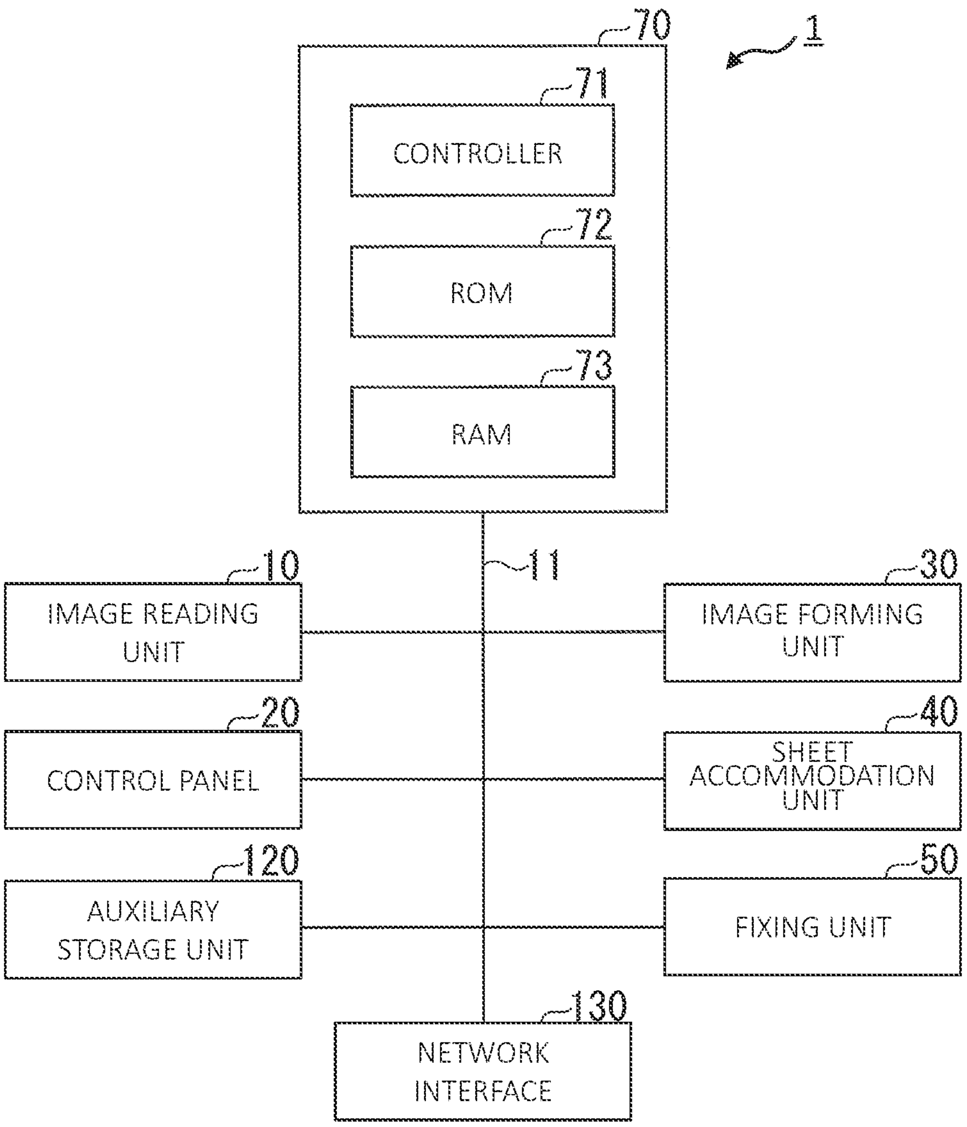
FIG. 5 is a block diagram illustrating a configuration of an image forming apparatus according to an embodiment.

FIG. 5 is a block diagram illustrating a configuration of the image forming apparatus 1 according to an embodiment.

The image forming apparatus 1 includes an image reading unit 10, a control panel 20, an image forming unit 30, a sheet accommodation unit 40, a fixing device 50, an engine controller 60, a control unit 70, an auxiliary storage unit 120, and a network interface 130. The functional units are communicably connected to each other via a system bus 11.

The image reading unit 10, the control panel 20, the image forming unit 30, the sheet accommodation unit 40, and the fixing device 50 are the same or substantially the same as the corresponding units depicted in FIGS. 1 to 4. The control unit 70, the auxiliary storage device 120, and the network interface 130 will be mainly described in this context.

The control unit 70 includes a controller 71, a ROM (Read Only Memory) 72, and a RAM (Random Access Memory) 73. The controller 71 is, for example, a processor such as a central processing unit (CPU) or a graphics processing unit (GPU). The controller 71 controls the operation of each functional unit of the image forming apparatus 1. The controller 71 executes various types of process by loading the program stored in the ROM 72 to the RAM 73 and executing the program. ASIC (Application Specific Integrated Circuit) may take an appropriate function realized by the controller 71. The ASIC is a dedicated circuit for realizing a specific function.

For example, the controller 71 controls one of the first heating source 53 and the second heating source 54 to perform printing according to the size of the sheet on which an image is to be printed. For example, the controller 71 controls the first heating source 53 for performing printing on the sheet having the first size. The controller 71 controls the second heating source 54 for performing printing on the sheet having the second size. The controller 71 also controls display of the control panel 20 when one of the first heating source 53 and the second heating source 54 has a failure or is in a malfunction state or the like.

The ROM 72 stores a program or programs for causing the controller 71 to operate. The RAM 73 is a memory that temporarily stores data used by the respective functional units included in the image forming apparatus 1. The RAM 73 may store digital data generated by the image reading unit 10. The RAM 73 may temporarily store a job and a job log.

The auxiliary storage device 120 is, for example, a hard disk drive or a solid-state drive (SSD) and stores various kinds of data. The various types of data include, for example, digital data, a job, a job log, and the like.

The network interface 130 transmits and receives data to and from other devices (or apparatuses). Other devices include, for example, an information processing apparatus such as a personal computer or the like. The network interface 130 operates as an input interface and receives print data or instructions transmitted from one or more other devices. The instructions transmitted from the other devices include an instruction to execute the printing. In addition, the network interface 130 operates as an output interface and transmits data to one or more other devices.

Figure 6:
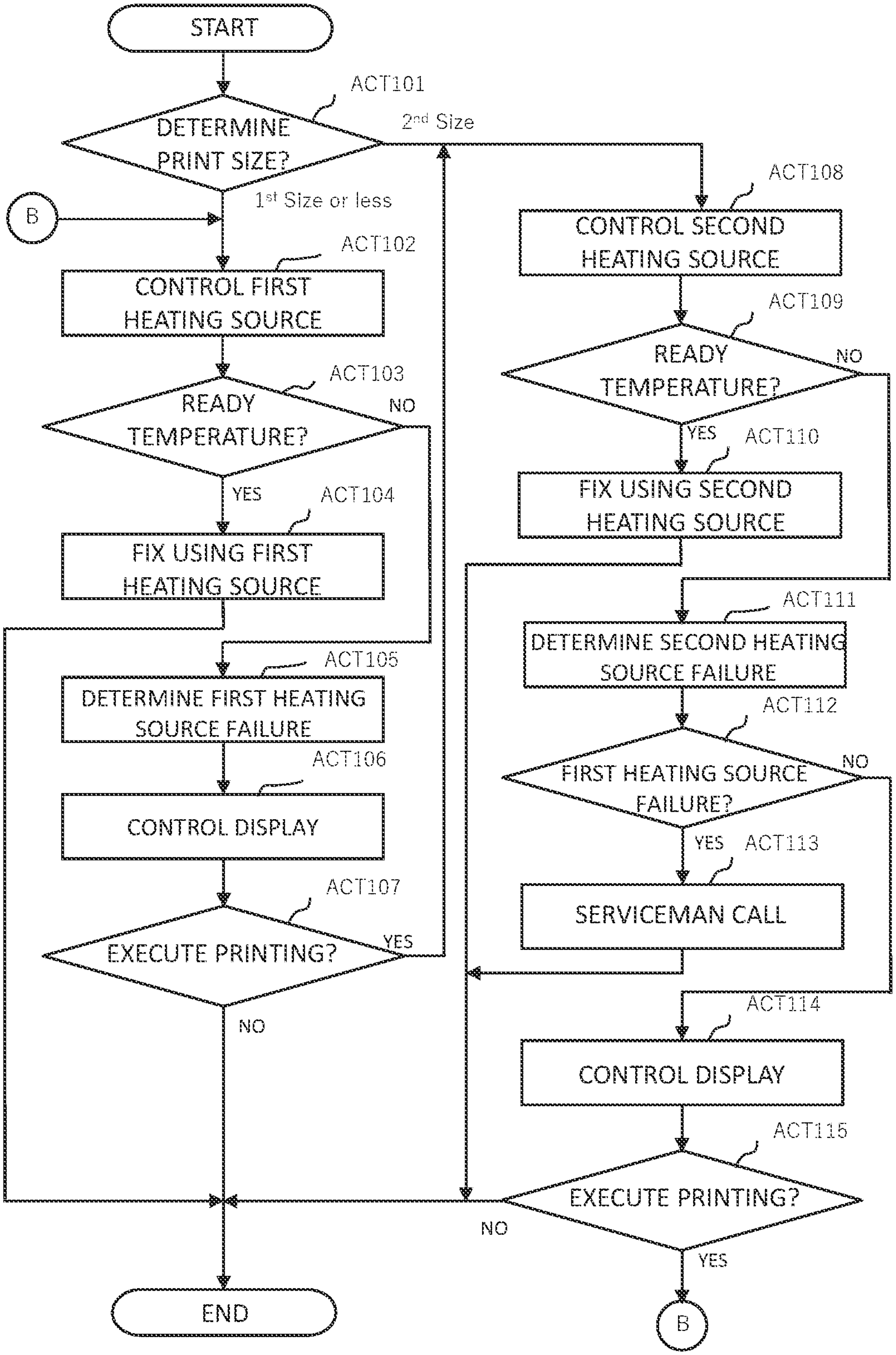
FIG. 6 is a flowchart of an image fixing process performed by an image forming apparatus according to an embodiment.

FIG. 6 is a flowchart of the image fixing process performed by the image forming apparatus 1 according to an embodiment. The image fixing process illustrated in FIG. 6 is executed when an instruction to perform printing is issued to the image forming apparatus 1.

The controller 71 determines a print size specified by a print execution instruction (ACT 101). In one embodiment, the controller 71 determines whether the print size (e.g., a sheet size setting) specified by the print execution instruction is equal to or less than the first size or is equal to the second size. When the print size designated by the print execution instruction is equal to or less than the first size, the controller 71 executes the ACT 102.

On the other hand, in a case where the print size designated by the print execution instruction is equal to the second size (ACT 101: second size), the controller 71 executes the process in ACT 108.

The controller 71 executes the temperature control of the first heating source 53 (ACT 102). In one embodiment, the controller 71 supplies electric power to the first heating source 53 to increase the temperature of the first heating source 53. The controller 71 waits for a predetermined period until the temperature of the first heating source 53 rises. The predetermined period may be set longer than a time period during which the temperature of the first heating source 53 can reach a predetermined temperature (which is, for example, a ready temperature at which the image fixing process can be properly performed to the image formed on the sheet or the fixing device 50 is ready for the image fixing process) after the temperature control for the heating source is performed. The controller 71 determines whether the temperature of the fixing belt 51 has reached the predetermined temperature, such as the ready temperature (hereinafter, the descriptions of the flowchart refers to the ready temperature according to the present embodiment), based the temperature information obtained by the temperature sensor 55 after the lapse of the predetermined period (ACT 103).

When the ready temperature has been reached (ACT 103: YES), the fixing device 50 performs the fixing process by the first heating source 53 (ACT 104). In one embodiment, when the temperature of the fixing belt 51 has reached the ready temperature, the controller 71 controls the various rollers to convey the sheet to the fixing device 50. When the sheet passes through the fixing device 50, the image formed on the sheet is fixed to the sheet. This completes the fixing process by the first heating source 53, and the process in FIG. 6 ends.

In the process in ACT 103, when the temperature has not reached the ready temperature (ACT 103: NO), the controller 71 determines (identifies) that the first heating source 53 has a failure or is in a malfunctioning state or the like in which the first heating source 53 is not performing in a normal manner (ACT 105). Then, the controller 71 controls the display of the control panel 20 (ACT 106). In one embodiment, the controller 71 causes the control panel 20 to display information indicating that, for example, the printing is possible, but the printing speed will be reduced due to a failure of the first heating source 53. Then, the controller 71 determines whether an instruction to execute or continue printing has been issued by, for example, user's operation via the control panel 20 (ACT 107).

If an instruction to execute printing has been issued (ACT 107: YES), the controller 71 executes ACT 108.

On the other hand, if an instruction to execute printing has not been issued (NO in ACT 107), the process in FIG. 6 ends. Here, the case where a print execution instruction has not been issued may refer to a case where an instruction to end printing has been issued or a case where no operation by a user has been performed or entered for a predetermined period of time.

As a process in ACT 108, the controller 71 controls the temperature of the second heating source 54 (ACT 108). In one embodiment, the controller 71 supplies electric power to the second heating source 54 to increase the temperature of the second heating source 54. The controller 71 waits for a predetermined period for the temperature of the second heating source 54 to rise. The controller 71 determines whether the temperature of the fixing belt 51 has reached the ready temperature based on the temperature information obtained by the temperature sensor 55 after the lapse of the predetermined period (ACT 109).

When the ready temperature has been reached (ACT 109: YES), the fixing device 50 performs the fixing process by the second heating source 54 (ACT 110). In one embodiment, when the temperature of the fixing belt 51 has reached the ready temperature, the controller 71 controls the various rollers to convey the sheet to the fixing device 50. When the sheet passes through the fixing device 50, the image formed on the sheet is fixed to the sheet. This completes the fixing process by the second heating source 54, and the process in FIG. 6 is completed.

In the process in ACT 109, when the temperature has not reached the ready temperature (ACT 109: NO), the controller 71 determines (identifies) that the second heating source 54 has a failure or is in a malfunctioning state (ACT 111).

Then, the controller 71 next determines whether the first heating source 53 also has a failure (ACT 112). In one embodiment, the controller 71 controls the temperature of the second heating source 54 in substantially the same manner as the first heating source 53 and likewise determines whether the first heating source 53 also has a failure in accordance with whether the temperature has reached the ready temperature. For example, the controller 71 determines (identifies) that the first heating source 53 does not have a failure if the ready temperature is reached within a predetermined period. On the other hand, the controller 71 determines that the first heating source 53 has a failure when the temperature has not reached the ready temperature after the lapse of the predetermined period.

If the first heating source 53 has also failed (ACT 112: YES), the controller 71 makes a serviceman call regarding the failure of the heating source(s) (ACT 113). In one embodiment, when both the first heating source 53 and the second heating source 54 fail, the controller 71 outputs the failure information to an outside device or the like. In addition, the controller 71 may cause an error lamp included in the image forming apparatus 1 to blink or the like. The controller 71 may display an error message or the like on the screen of the control panel 20.

On the other hand, if the first heating source 53 does not have a failure (ACT 112: NO), the controller 71 controls the control panel 20 (ACT 113) to display information accordingly. Specifically, the controller 71 causes the control panel 20 to display information indicating that, due to a failure or malfunction of the second heating source 54, printing is possible only if a sheet size is equal to or less than the first size. Then, the controller 71 next determines whether an instruction to execute or continue printing has been issued by, for example, a user input operation via the control panel 20 (ACT 115).

If an instruction to execute printing has been issued (YES in ACT 115), the controller 71 executes the process in ACT 102 and the subsequent process.

On the other hand, if an instruction to execute the printing has not been issued (NO in ACT 115), the process in FIG. 6 ends.

The image forming apparatus 1 according to the present embodiment is capable of efficiently performing printing. The image forming apparatus 1 performs printing by controlling one of the first heating source 53 and the second heating source 54 in accordance with the size of a sheet on which the printing is to be performed. The first heating source 53 has a width (heating width) capable of heating the first size, and also has a characteristic that a decrease in the heater output power stays less than a predetermined threshold value even when the temperature of the heater increases. The second heating source 54 has a width (heating width) capable of heating the second size, which is larger than the first size, and has a characteristic that the heater output power decreases significantly as the temperature of the heater increases. The image forming apparatus 1 switches between the heating source to be used in accordance with the size of the sheet to be printed. Accordingly, the second heating source 54 is not generally used for printing sheets of all sizes, but rather just the larger sizes. Therefore, it is possible to keep the number of printed sheets high since pauses/stops due to decreases in the power output of the sheet passing region with increased temperature can be limited/avoided. Furthermore, since the power output of the first heating source 53 does not significantly decrease even when continuous printing is performed. This makes it possible to realize high productivity (sheet throughput) when a size of a sheet to be printed is equal to or less than the first size. Therefore, it is possible to efficiently perform printing.

In a case where the image forming apparatus 1 performs printing of the first size or less, the image forming apparatus 1 heats the first size range. Accordingly, it is possible to achieve energy saving as compared to a case where the second size range is always heated.

The image forming apparatus 1 includes a plurality of heating sources. Therefore, even in a case where the first heating source 53 fails, the image forming apparatus 1 can continue printing by the second heating source 54. Further, since printing is continuously performed by switching the heating sources, it is possible to reduce an inconvenience of the user until the faulty heating source is repaired.

The image forming apparatus 1 determines the failure of the heating sources 53 and 54 based on the temperature information obtained by the temperature sensor 55. Thereby, it is possible to determine the heating source failure without requiring any additional circuit.

Hereinafter, modified examples of the image forming apparatus 1 will be described.

The first heating source 53 may be a heater that does not have a resistance temperature coefficient characteristic.

The first heating source 53 may be a heater lamp or an induction heating system having a halogen lamp as long as it has a resistance temperature coefficient characteristic in which a change in output power is less than a threshold value in accordance with a change in temperature.

The second heating source 54 may be a heater lamp or an induction heating system having a halogen lamp as long as it has a resistance temperature coefficient characteristic in which a change in output power becomes equal to or greater than a threshold value in accordance with a change in temperature.

All or part of the functions of the image forming apparatus 1 according to one or more of the present embodiments may be realized by a computer or a computer system. In this case, a program (or programs) for realizing such functions is recorded in a computer-readable medium. The program is then read from the recording medium and executed by the computer or computer system. The "computer system" herein includes hardware such as an operating system and peripheral devices. The "computer-readable medium" includes a portable medium, a storage device, or the like. The portable medium may be a flexible disk, a magneto-optical disk, a ROM, a CD-ROM, or the like. The storage device may be a hard disk or the like built in to the computer system. The "computer-readable medium" may hold the program for a short time. The computer-readable medium may be accessed by communication line or a network such as the Internet, a telephone line, or the like. The "computer-readable medium" may be memory within a computer system serving as a server or a client. The program may be a program for realizing all or part of the functions of the image forming apparatus 1. The program may be capable of realizing such functions in combination with another program already recorded in the computer system.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. An image forming apparatus, comprising:

a fixing device configured to fix an image to a sheet and including a first heating source and a second heating source, the second heating source having a heating width greater than a heating width of the first heating source; and a controller to select one of the first heating source or the second heating source in accordance with a size of a sheet to be supplied to the fixing device for fixing, wherein if one of the first heating source and the second heating source fails, the controller is configured to select the other one of the first heating source and the second heating source irrespective of the size of the sheet, the first heating source and the second heating source are spaced from each other in a conveyance direction of the sheet through the fixing device, the first heating source has a resistance temperature coefficient (TCR) characteristic such that a change in output power will be less than a threshold value in accordance with a change in temperature, the second heating source has a resistance temperature coefficient (TCR) characteristic that a change in output power is equal to or greater than the threshold value in accordance with a change in temperature, the second heating source has a heating output power that decreases with increases in temperature, and the first heating source has a heating output power that decreases with increases in temperature less than the second heating source.

2. The image forming apparatus according to claim 1, wherein the first heating source and the second heating source are parallel with each other along a direction intersecting the conveyance direction.

3. The image forming apparatus according to claim 1, wherein the first heating source is on a downstream side of the second heating source in the conveyance direction with respect to a rotation direction of a fixing belt in the fixing device.

4. The image forming apparatus according to claim 1, wherein the heating width of the first heating source corresponds to a sheet of a first size, the heating width of the second heating source corresponds to a sheet of a second size larger than the first size, and the controller is further configured to select the first heating source for fixing a sheet of the first size or less and to select the second heating source for fixing a sheet of the second size.

5. The image forming apparatus according to claim 1, wherein the fixing device further comprises a temperature sensor configured to acquire temperature information of the fixing device, and the controller is further configured to identify a failure of the first heating source or the second heating source based on the temperature information obtained by the temperature sensor.

6. The image forming apparatus according to claim 5, wherein the controller is configured to identify that the first heating source or the second heating source has a failure if the temperature information acquired by the temperature sensor indicates the temperature of the fixing device has not reached a ready temperature after a predetermined period from a heating start.

7. The image forming apparatus according to claim 6, wherein the fixing device further comprises a fixing belt, and the temperature sensor acquires temperature information corresponding to a temperature of the fixing belt.

8. The image forming apparatus according to claim 1, wherein the heating output power of the first heating source changes with temperature less than the heating output power of the second heating source changes with temperature over a temperature range of 25° C. to 300° C.

9. An image forming apparatus, comprising:

a fixing device configured to fix an image to a sheet and including a first heating source and a second heating source, the second heating source having a heating width greater than a heating width of the first heating source; and a controller to select one of the first heating source or the second heating source in accordance with a size of a sheet to be supplied to the fixing device for fixing, wherein if one of the first heating source and the second heating source fails, the controller is configured to select the other one of the first heating source and the second heating source irrespective of the size of the sheet, the first heating source and the second heating source are spaced from each other in a conveyance direction of the sheet through the fixing device, the first heating source has a resistance temperature coefficient (TCR) characteristic such that a change in output power will be less than a threshold value with a change in temperature, and the second heating source has a resistance temperature coefficient (TCR) characteristic that a change in output power is equal to or greater than the threshold value with a change in temperature.

10. The image forming apparatus according to claim 9, wherein the first heating source and the second heating source are parallel with each other along a direction intersecting the conveyance direction.

11. The image forming apparatus according to claim 9, wherein the first heating source is on a downstream side of the second heating source in the conveyance direction with respect to a rotation direction of a fixing belt in the fixing device.

12. The image forming apparatus according to claim 9, wherein the heating width of the first heating source corresponds to a sheet of a first size, the heating width of the second heating source corresponds to a sheet of a second size larger than the first size, and the controller is further configured to select the first heating source for fixing a sheet of the first size or less and to select the second heating source for fixing a sheet of the second size.

13. The image forming apparatus according to claim 9, wherein the fixing device further comprises a temperature sensor configured to acquire temperature information of the fixing device, and the controller is further configured to identify a failure of the first heating source or the second heating source based on the temperature information obtained by the temperature sensor.

14. The image forming apparatus according to claim 13, wherein the controller is configured to identify that the first heating source or the second heating source has a failure if the temperature information acquired by the temperature sensor indicates the temperature of the fixing device has not reached a ready temperature after a predetermined period from a heating start.

15. The image forming apparatus according to claim 14, wherein the fixing device further comprises a fixing belt, and the temperature sensor acquires temperature information corresponding to a temperature of the fixing belt.

16. The image forming apparatus according to claim 9, wherein the heating output power of the first heating source changes with temperature less than the heating output power of the second heating source changes with temperature over a temperature range of 25° C. to 300° C.

* * * * *